(12) United States Patent  (10) Patent No.: US 6,739,230 B2
Chang                      (45) Date of Patent: May 25, 2004

(54) ADJUSTING DEVICE FOR A TABLE SAW

(76) Inventor: Chin-Chin Chang, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 0 days.

(21) Appl. No.: 10/075,814

(22) Filed: Feb. 13, 2002

(65) Prior Publication Data

US 2003/0150312 A1 Aug. 14, 2003

(51) Int. Cl.$^7$ ................................................ B23D 45/06
(52) U.S. Cl. ........................ 83/473; 83/477.1; 83/477.2
(58) Field of Search ............................... 83/473, 477.1, 83/477.2, 471.3, 472, 477, 490

(56) References Cited

U.S. PATENT DOCUMENTS 2,852,047 A * 9/1958 Odlum et al. ................. 83/473
5,040,444 A * 8/1991 Shiotani et al. ............... 83/473
6,283,002 B1 * 9/2001 Chiang ...................... 83/477.1
6,370,997 B1 * 4/2002 Rugen et al. ............... 83/471.3
6,539,831 B2 * 4/2003 Huang ....................... 83/477.2
2002/0174755 A1 * 11/2002 Behne et al. ............... 83/477.2

* cited by examiner

Primary Examiner—Stephen Choi
(74) Attorney, Agent, or Firm—Connolly Bove Lodge & Hutz LLP

(57) ABSTRACT

An adjusting device for a table saw includes a pivot rod adapted to be longitudinally mounted under a tabletop of the table saw, a panel extending downward from the tabletop, a rotatable seat pivotally mounted on the pivot rod, a pivotal seat pivotally mounted on the rotatable seat, and a set of adjusting elements respectively mounted on the rotatable seat and the pivotal seat for adjusting a height and an angle of a saw blade of the table saw. The set of adjusting elements includes a threaded rod provided to precisely adjust the height of a saw blade and a gear provided to precisely adjust the angle of the saw blade of the table saw.

6 Claims, 4 Drawing Sheets

ADJUSTING DEVICE FOR A TABLE SAW

BACKGROUND OF THE INVENTION

1. Field of the Invention

The present invention relates to an adjusting device, and more particularly to an adjusting device for a table saw.

2. Description of Related Art

A table saw essentially includes an adjusting device to adjusting the height and the angle of the saw blade. A conventional adjusting device for a table saw in accordance with the prior art comprises a threaded rod mounted to push a pivotal seat to adjusting the height of the saw blade relative to the tabletop of the table saw. A knob is mounted and selectively engaged to a panel of the table saw. The knob is pushed and escaped from the panel to moved as a circling motion for adjusting the angle of the saw blade relative to the tabletop of the table saw.

However, there is no gear or teeth between the knob and the panel so that the adjustment of the saw blade is not precise. Furthermore, the conventional adjusting device uses two threaded rods to adjusting the height and the angle of the saw blade. It is a complicated device and needs to be advantageously altered.

The present invention has arisen to mitigate and/or obviate the disadvantages of the conventional adjusting device for a table saw.

SUMMARY OF THE INVENTION

The main objective of the present invention is to provide an improved adjusting device for a table saw.

To achieve the objective, the adjusting device for a table saw includes a pivot rod adapted to be longitudinally mounted under a tabletop of the table saw, a panel extending downward from the tabletop, a rotatable seat pivotally mounted on the pivot rod, a pivotal seat pivotally mounted on the rotatable seat, and a set of adjusting elements respectively mounted on the rotatable seat and the pivotal seat for adjusting a height and an angle of a saw blade of the table saw. The set of adjusting elements includes a threaded rod provided to precisely adjust the height of a saw blade and a gear provided to precisely adjust the angle of the saw blade of the table saw.

Further benefits and advantages of the present invention will become apparent after a careful reading of the detailed description with appropriate reference to the accompanying drawings.

DETAILED DESCRIPTION OF THE INVENTION

Figure 1:
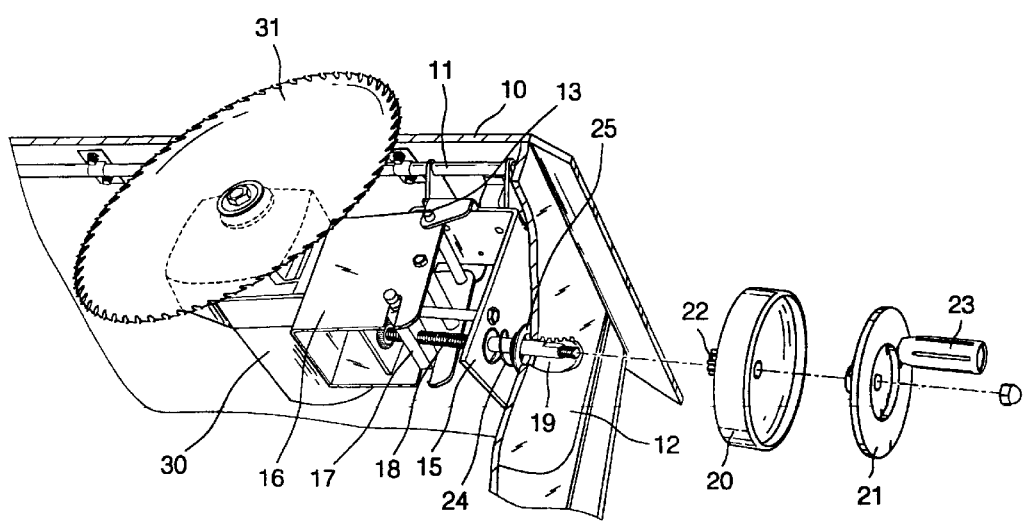
FIG. 1 is a partially exploded perspective view of an adjusting device for a table saw in accordance with the present invention.
Figure 2:
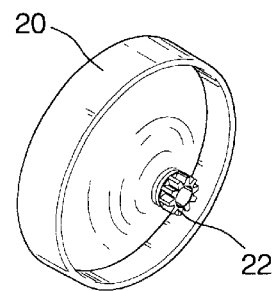
FIG. 2 is a perspective view of a knob of the adjusting device for a table saw in FIG. 1.
Figure 3:
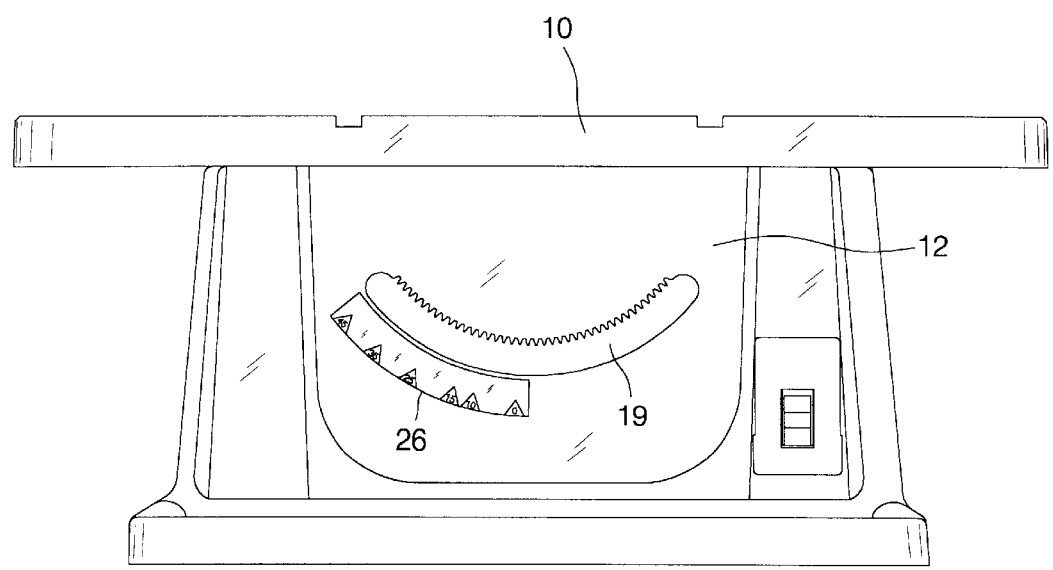
FIG. 3 is a front plan view of a panel of the adjusting device for a table saw in FIG. 1.

With reference to the drawings and initially to FIGS. 1, 2 and 3, an adjusting device for a table saw in accordance with the present invention comprises pivot rod (11) adapted to be longitudinally mounted under a tabletop (10) of the table saw, a panel (12) extending downward from the tabletop (10), a rotatable seat (15) pivotally mounted on the pivot rod (11), a pivotal seat (16) pivotally mounted on the rotatable seat (15), and a set of adjusting elements respectively mounted on the rotatable seat (15) and the pivotal seat (16) for adjusting a height and an angle of a saw blade of the table saw.

The rotatable seat (15) is inverted U-shaped and has two side plates (not numbered). An axle (13) is secured within the rotatable seat (15). The pivotal seat (16) in pivotally mounted to the axle (13). The pivotal seat (16) is U-shaped in a bottom view such that one side plate of the rotatable seat (15), far away from the panel (12), is within the pivotal seat (16). The pivotal seat (16) has a bottom (not numbered) adapted to be connected to a motor (30) and two side plates (not numbered) respectively extending from two opposite sides of the bottom of the pivotal seat (16). The motor (30) is provided to drive a saw blade (31) of the table saw. An actuated rod (17) is laterally and pivotally secured in the pivotally seat (16) and has a threaded hole (not numbered) longitudinally defined in the actuated rod (17) and extending through the actuated rod (17). The panel (12) has a curved groove (19) defined therein and extending through the panel (12). The groove (19) corresponds to the threaded hole in the actuated rod (17) and includes topside having a series of teeth formed on the topside of the groove (19).

The set of adjusting elements comprises a threaded rod (18) rotatably mounted on the two side plates of the rotatable seat (15). The threaded rod (18) is screwed into the threaded hole in the actuated rod and extending through the actuated rod (17). A threaded portion of the threaded rod (18) is formed between the two side plates of the rotatable seat (15). The threaded rod (18) extends through the groove (19) in the panel (12). A knob (20) is centrally penetrated by the threaded rod (18) and is rotatable relative to the threaded rod (18). The knob (20) has a cavity (not numbered) defined to rotatably receive an adjusting wheel (21) and a gear (22) centrally extending from the knob (20) opposite to the cavity. The gear (22) is engaged to the series of the teeth of the groove (19) in the panel (12). The adjusting wheel (21) is detachably mounted on a free end of the threaded rod (18) to drive the threaded rod (18). For an easy operation, a handle (23) is pivotally mounted to the adjusting wheel (21). A spring (24) is sleeved on the threaded rod (18) and compressively situated between rotatable seat (15) and an inner periphery of the panel (12). The spring (24) has two opposite ends respectively securely abutting the rotatable seat (15) and the panel (12). A washer (25) is secured on one end of the spring (24) around the threaded rod (18) and slidably abuts the panel (12). For a precise adjustment, a scale (26) is attached to the panel (12) and corresponding to the curved groove (19) in the panel (12).

Figure 4:
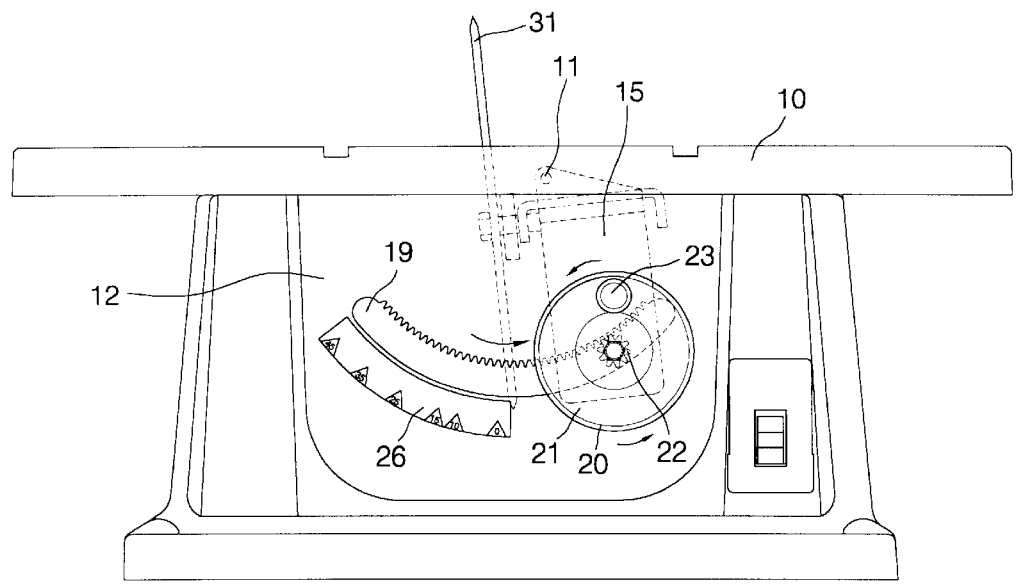
FIG. 4 is a front operational plan view of the adjusting device for a table saw in FIG. 1 when adjusting the angle of a saw blade of the table saw.
Figure 5:
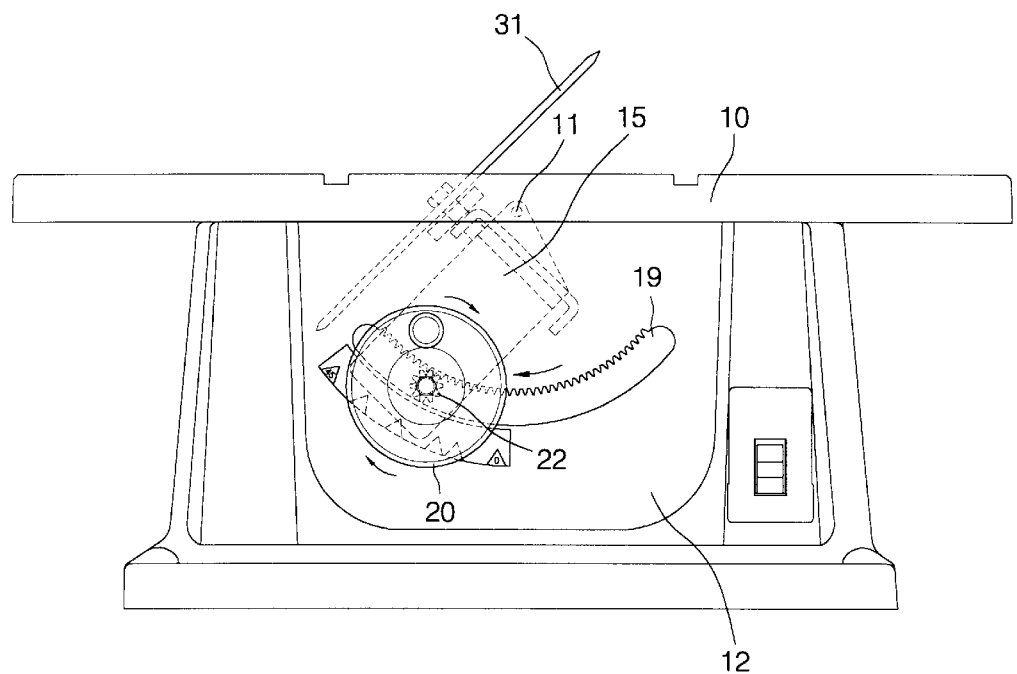
FIG. 5 is a front operational plan view of the adjusting device for a table saw in FIG. 1 when adjusting the angle of the saw blade of the table saw.

To adjust the angle of the saw blade relative to the tabletop of the table saw, with reference to FIGS. 4 and 5, the threaded rod (18) is driven to be moved in the curved groove (19) in the panel (12) when the knob (20) is rotated because the gear (22) of the knob (20) is engaged to the teeth on the topside of the curved groove (19). Then the threaded rod (18) drives the rotatable seat (15), the pivotal seat (16), the motor (30) and the saw blade (31) moved as a circling motion relative to the pivot rod (11) because the rotatable seat (15) is pivotally mounted to the pivot rod (11). Consequently, the angle of the saw blade relative to the tabletop of the table saw is precisely adjusted with the scale (26).

Figure 6:
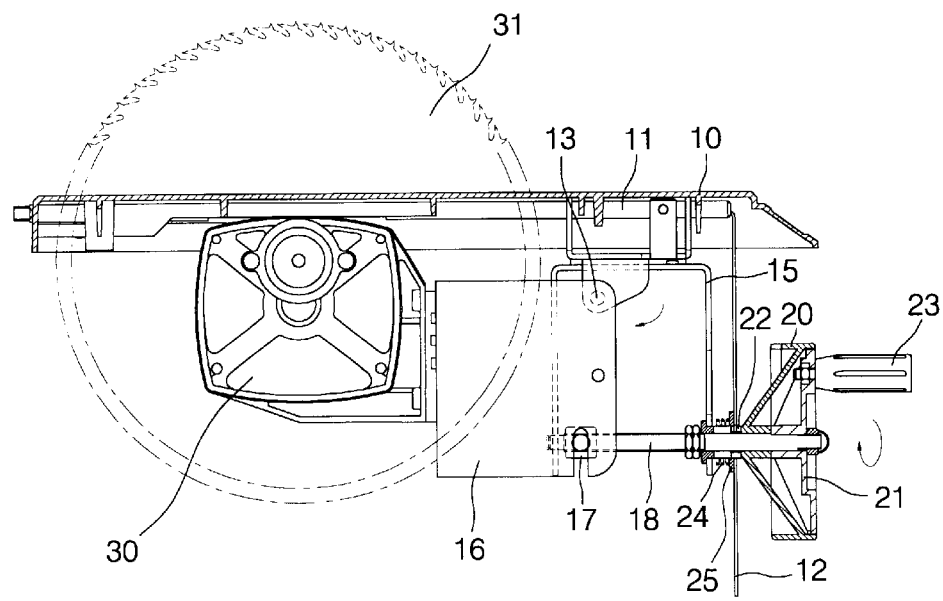
FIG. 6 is a side operational plan view of the adjusting device for a table saw in FIG. 1 when adjusting the height of the saw blade of the table saw.
Figure 7:
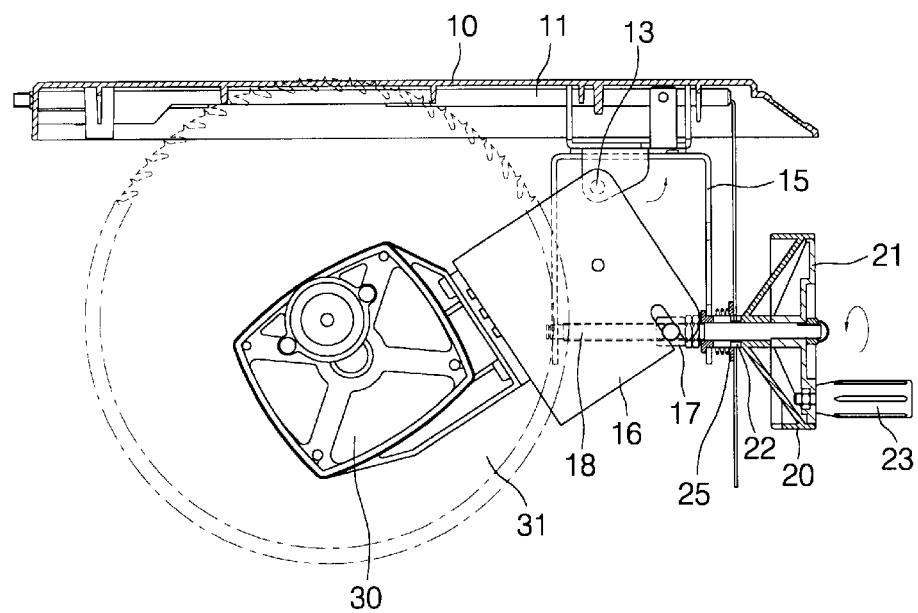
FIG. 7 is a side operational plan view of the adjusting device for a table saw in FIG. 1 when adjusting the height of a saw blade of the table saw.

To adjust the height of the saw blade relative to the tabletop of the table saw, with reference to FIGS. 6 and 7, the threaded rod (18) drives the pivotal seat (16), the motor (30) and the saw blade (31) moved as a circling motion relative to the axle (13) such that the height of the saw blade relative to the tabletop of the table saw is adjusted.

An interval between elements of any machine is hard to avoid after using for a long time. To solve the problem, the spring (24) of the present invention is compressively mounted between the rotatable seat (15) and the panel (12) and pushes the rotatable seat (15) due to the restitute force of the spring (24) so that the interval between the threaded rod (18) and the threaded hole in the actuated rod (17) is overcome by the spring (24).

As described above, the adjusting device for a table saw in accordance with the present invention uses a gear to precisely adjust the angle, a threaded rod to precisely adjust the height of a saw blade of a table saw and a spring to eliminate the interval between elements so that the adjusting device for a table saw in accordance with the present invention obviates the disadvantages of the conventional adjusting device for a table saw.

Although the invention has been explained in relation to its preferred embodiment, it is to be understood that many other possible modifications and variations can be made without departing from the spirit and scope of the invention as hereinafter claimed.

What is claimed is:

1. An adjusting device for a table saw that has a tabletop, comprising:

a pivot rod adapted to be longitudinally mounted under the tabletop of the table saw;

a panel adapted to extend downward from the tabletop and having a curved groove defined in the panel, the curved groove including a topside and a series of teeth formed on the topside of the curved groove;

a rotatable seat pivotally mounted on the pivot rod, the rotatable seat moved as a circling motion relative to the pivot rod, the rotatable seat having an axle laterally mounted within the rotatable seat;

a pivotal seat rotatable mounted on the axle and moved as a circling motion relative to the axle, the pivotal seat having an actuated rod laterally and pivotally mounted within the pivotal seat, the actuated rod having a threaded hole defined therein and corresponding to the curved groove in the panel, the pivotal seat adapted to be connected to a motor of the table saw;

a threaded rod extending through the curved groove and the rotatable seat, the threaded rod screwed through the threaded hole in the actuated rod to drive the pivotal seat when the threaded rod is rotated;

a knob centrally and rotatable penetrated by the threaded rod, the knob having a gear centrally extending therefrom and engaged to the series of teeth on the topside of the curved groove in the panel to drive the rotatable seat and the pivot seat move as a circling motion relative to the pivot rod, a cavity centrally defined in the knob;

an adjusting wheel attached to a free end of the threaded rod and rotatably received in the cavity in the knob for driving the threaded rod to drive the pivotal seat moved as a circling motion relative to the axle; and a spring compressively sleeved on the threaded rod and situated between the rotatable seat and the panel to overcome an interval between the threaded rod and the threaded hole in the actuated rod.

2. The adjusting device for a table saw as claimed in claim 1, wherein the panel has a scale attached to the panel under the curved groove in the panel.

3. The adjusting device for a table saw as claimed in claim 1 further comprising a washer sleeved on the threaded rod and secured on one end of the spring to abut the panel.

4. The adjusting device for a table saw as claimed in claim 1, wherein the adjusting wheel has a handle extending therefrom.

5. The adjusting device for a table saw as claimed in claim 1, wherein the rotatable seat is inverted U-shaped.

6. The adjusting device for a table saw as claimed in claim 1, wherein the pivotal seat is U-shaped.

* * * * *